(12) United States Patent
Katano et al.

(10) Patent No.: US 9,029,035 B2
(45) Date of Patent: May 12, 2015

(54) FUEL CELL SYSTEM

(75) Inventors: Koji Katano, Toyota (JP); Toshiyuki Inagaki, Toyota (JP); Nobutaka Teshima, Toyota (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 147 days.

(21) Appl. No.: 12/681,831

(22) PCT Filed: Oct. 22, 2008

(86) PCT No.: PCT/JP2008/069144
§ 371 (c)(1),
(2), (4) Date: Apr. 6, 2010

(87) PCT Pub. No.: WO2009/066535
PCT Pub. Date: May 28, 2009

(65) Prior Publication Data
US 2010/0233561 A1 Sep. 16, 2010

(30) Foreign Application Priority Data
Nov. 20, 2007 (JP) ................. 2007-300358

(51) Int. Cl.
*H01M 8/04* (2006.01)
*H01M 8/24* (2006.01)

(52) U.S. Cl.
CPC ........ *H01M 8/04089* (2013.01); *H01M 8/2415* (2013.01); *H01M 8/2485* (2013.01); *Y02E 60/50* (2013.01)

(58) Field of Classification Search
CPC ................................................ H01M 8/04089
USPC .................................................. 429/400–535
See application file for complete search history.

(56) References Cited

U.S. PATENT DOCUMENTS

| | | | |
|---|---|---|---|
| 2009/0252997 A1* | 10/2009 | Katano et al. | 429/13 |
| 2009/0280371 A1* | 11/2009 | Katano | 429/22 |
| 2010/0040922 A1* | 2/2010 | Katano et al. | 429/25 |
| 2010/0209797 A1* | 8/2010 | Katano et al. | 429/454 |

FOREIGN PATENT DOCUMENTS

| | | |
|---|---|---|
| DE | 112007002793 T5 | 10/2009 |
| JP | 2003-192356 A | 7/2003 |
| JP | 2005-310553 A | 11/2005 |
| JP | 2006-107979 A | 4/2006 |
| JP | 2006-114415 A | 4/2006 |

(Continued)

OTHER PUBLICATIONS

Katano, Goji. JP 2005-310553 A: English machine translation provided by JPO.*

(Continued)

*Primary Examiner* — Kenneth Douyette
*Assistant Examiner* — James Lee
(74) *Attorney, Agent, or Firm* — Kenyon & Kenyon LLP

(57) ABSTRACT

A fuel cell system includes a cell stack body formed by stacking fuel cells on top of each other, end plates arranged at ends in the cell stacking direction of the cell stack body, and a fluid regulation device mounted in a flow path connected to the cell stack body and regulating conditions of fluid flowing in the flow path. The fluid regulation device is fixed to an end plate only at either of a fluid entrance portion and a fluid exit portion of the fluid regulation device.

2 Claims, 8 Drawing Sheets

(56) References Cited

FOREIGN PATENT DOCUMENTS

| | | | |
|---|---|---|---|
| JP | 2006-185748 A | 7/2006 | |
| JP | 2006-221915 A | 8/2006 | |
| JP | 2006-294347 A | 10/2006 | |
| JP | 2007-42457 A | 2/2007 | |
| JP | 2007-52948 A | 3/2007 | |
| JP | 2007-73293 A | 3/2007 | |
| JP | 2007-165186 A | 6/2007 | |
| JP | 2007-194189 A | 8/2007 | |
| JP | 2007-294330 * | 11/2007 | H01M 8/24 |
| JP | 2008-130446 A | 6/2008 | |
| JP | 2008-130447 A | 6/2008 | |
| JP | 2008-130492 A | 6/2008 | |
| JP | 2008-146923 A | 6/2008 | |
| JP | 2008-243722 A | 10/2008 | |
| WO | WO 2007/077904 A1 * | 7/2007 | H01M 8/04 |
| WO | WO 2008/062702 A1 * | 5/2008 | H01M 8/04 |
| WO | WO 2008/062890 A1 * | 5/2008 | H01M 8/04 |

OTHER PUBLICATIONS

Einaga. JP 2007-294330. Nov. 8, 2007. English machine translation by JPO.*

German Office Action dated Nov. 20, 2012 of Application No. 112008002803.6-45.

* cited by examiner

FUEL CELL SYSTEM

This is a 371 national phase application of PCT/JP2008/069144 filed 22 Oct. 2008, claiming priority to Japanese Patent Application No. JP 2007-300358 filed 20 Nov. 2007, the contents of which are incorporated herein by reference.

TECHNICAL FIELD

The present invention relates to a fuel cell system, and, more particularly, to a fuel cell system in which, even when an end plate placed on an end with respect to a cell stacking direction of a cell stack is deflected, disadvantages due to the deflection can be inhibited.

BACKGROUND ART

As a fuel cell, there is known a structure in which a plurality of battery cells are stacked, each battery cell including, for example, a membrane electrode assembly (MEA) and separators which sandwich the MEA. The cell stack which is the collective structure of the stacked battery cells is sandwiched in the cell stacking direction by a pair of end plates. When fuel gas and oxidizing gas are supplied to the fuel cell stack, electrochemical reaction is caused and electric power is generated.

In the below-described Patent Document 1, a structure which uses an injector for supply of the fuel gas is described. The injector is an electromagnetically driven open/close valve in which a valve element is moved from a valve seat by an electromagnetic force, in order to open and close a flow path, and the amount and pressure of the supply of the fuel gas are regulated by controlling the open/close time period or the open/close timing of the flow path.

In addition, the below-described Patent Document 2 discloses a structure in which a control valve which controls a flow rate of the gas flowing in the fuel cell is placed at an outer surface of the fuel cell.

Patent Document 1: JP 2007-165186 A
Patent Document 2: JP 2005-310553 A

DISCLOSURE OF INVENTION

Problem to be Solved

There are cases where, during power generation operation of the fuel cell, the end plate is deflected to project toward the outside of the fuel cell. An example of the cause of the deflection is known to be an increase in load applied on the end plate due to swelling of the cell stack by the product water of the power generation. Another example of the cause of the deflection is thermal deformation due to heat generation during the power generation. Moreover, when the temperature of the end plate is increased by generated heat and the rigidity is reduced, the deflection due to the swelling tends to occur more often.

For example, in a structure where a body of the electromagnetic valve is supported on a support member on the end plate via an O-ring, when the end plate is deflected, the electromagnetic valve body and the support member may contact each other at locations other than the location of support by the O-ring. Due to such contact, vibration caused by movement of the valve element of the electromagnetic valve body may be transferred to the end plate, the cell stack, etc., which may cause a strong vibration and sound, or damage to soldering portions of the circuit board. In addition, when the deflected end plate contacts the electromagnetic valve body, similar strong vibration and sound and damage to the soldering portions may be caused. There may be cases where the deflection of the end plate causes a mechanical stress in the pipe connected to the electromagnetic valve body on the end plate, and the pipe connection section or the like is damaged.

As described, the deflection of the end plate may cause various disadvantages.

An advantage of the present invention is provision of a fuel cell system in which the disadvantages due to deflection of the end plate can be inhibited.

Means for Solving the Problem

According to one aspect of the present invention, there is provided a fuel cell system comprising a cell stack in which a plurality of battery cells are stacked, an end plate placed on an end with respect to a cell stacking direction of the cell stack, and a fluid regulation device which is provided on a flow path connected to the cell stack and which regulates a status of a fluid flowing in the flow path, wherein the fluid regulation device is fixed to the end plate only at one of a fluid entrance-side portion and a fluid exit-side portion of the fluid regulation device. With this structure, compared to the structure where both the fluid entrance-side portion and the fluid exit-side portion are fixed on the end plate, even when the endplate is deflected, the influence of the deflection on the fluid regulation device is reduced. Because of this, there can be provided a fuel cell system in which the disadvantages due to deflection of the end plate can be inhibited.

According to another aspect of the present invention, preferably, in the fuel cell system, the fluid regulation device has a fluid exit connected to the cell stack, and the fluid entrance-side portion is provided at an upper side in a direction of gravity in relation to the fluid exit-side portion. With this structure, there can be prevented intrusion of water produced in the cell stack into the fluid regulation device.

According to another aspect of the present invention, preferably, in the fuel cell system, a fluid path to the cell stack is connected to the one portion fixed to the end plate among the fluid entrance-side portion and the fluid exit-side portion, and a flow path which is longer than the flow path to the cell stack is connected to the other portion. With this structure, it is possible to absorb the mechanical stress caused on the flow path by the deflection of the end plate, with the other portion of the fluid entrance-side portion and the fluid exit-side portion and the long flow path connected to the other portion. In addition, it is possible to absorb the placement error of the fluid regulation device with respect to the end plate. Meanwhile, the shorter flow path connecting the fluid regulation device and the cell stack is connected to the one portion fixed on the end plate. Because of this, even when the end plate is deflected, the relative position of the shorter flow path with respect to the endplate is maintained, and the shorter flow path does not tend to be affected by the mechanical stress due to the deflection. Therefore, it is possible to inhibit the disadvantages brought by the deflection of the end plate.

According to another aspect of the present invention, preferably, in the fuel cell system, the other portion among the fluid entrance-side portion and the fluid exit-side portion of the fluid regulation device is attached to the endplate via an elastic body. With this structure, the load caused by the deflection of the endplate on the fluid regulation device is absorbed by deformation of the elastic body. In this manner, it is possible to inhibit the disadvantages caused by the deflection of the endplate. In addition, it is possible to prevent disadvantages due to vibration applied on the fuel cell system from the outside.

According to another aspect of the present invention, there is provided a fuel cell system comprising a cell stack in which a plurality of battery cells are stacked, an end plate placed on an end with respect to a cell stacking direction of the cell stack, and a fluid regulation device which is provided on a flow path connected to the cell stack and which regulates a status of a fluid flowing in the flow path, wherein the fluid regulation device comprises a sealing member having elasticity between one of a fluid entrance-side portion and a fluid exit-side portion of the fluid regulation device and a body portion, and the other portion among the fluid entrance-side portion and the fluid exit-side portion is attached to the endplate via an elastic body. With this structure, the load applied on the fluid regulation device by the deflection of the end plate is absorbed by deformation of the sealing member having elasticity and the elastic body. Because of this, it is possible to inhibit disadvantages due to the deflection of the end plate. In addition, it is possible to prevent disadvantages due to vibration applied on the fuel cell system from the outside.

Advantages

According to the above-described configurations, there can be provided a fuel cell system in which, even when the end plate is deflected, the disadvantages due to the deflection can be inhibited.

EXPLANATION OF REFERENCE NUMERALS

20 FUEL CELL SYSTEM; 102 BATTERY CELL; 104 CELL STACK; 106 END PLATE; 24, 26, 28, 30, 32 FLOW PATH; 200, 200B ELECTROMAGNETIC VALVE DEVICE (FLUID REGULATION DEVICE); 230 ENTRANCE-SIDE SUPPORT MEMBER (FLUID ENTRANCE-SIDE PORTION); 250 EXIT-SIDE SUPPORT MEMBER (FLUID EXIT-SIDE PORTION); G DIRECTION OF GRAVITY; 276, 278 PIPE (FLOW PATH); 240 BUSH (ELASTIC BODY); 272, 274 O-RING.

BEST MODE FOR CARRYING OUT THE INVENTION

Figure 1:
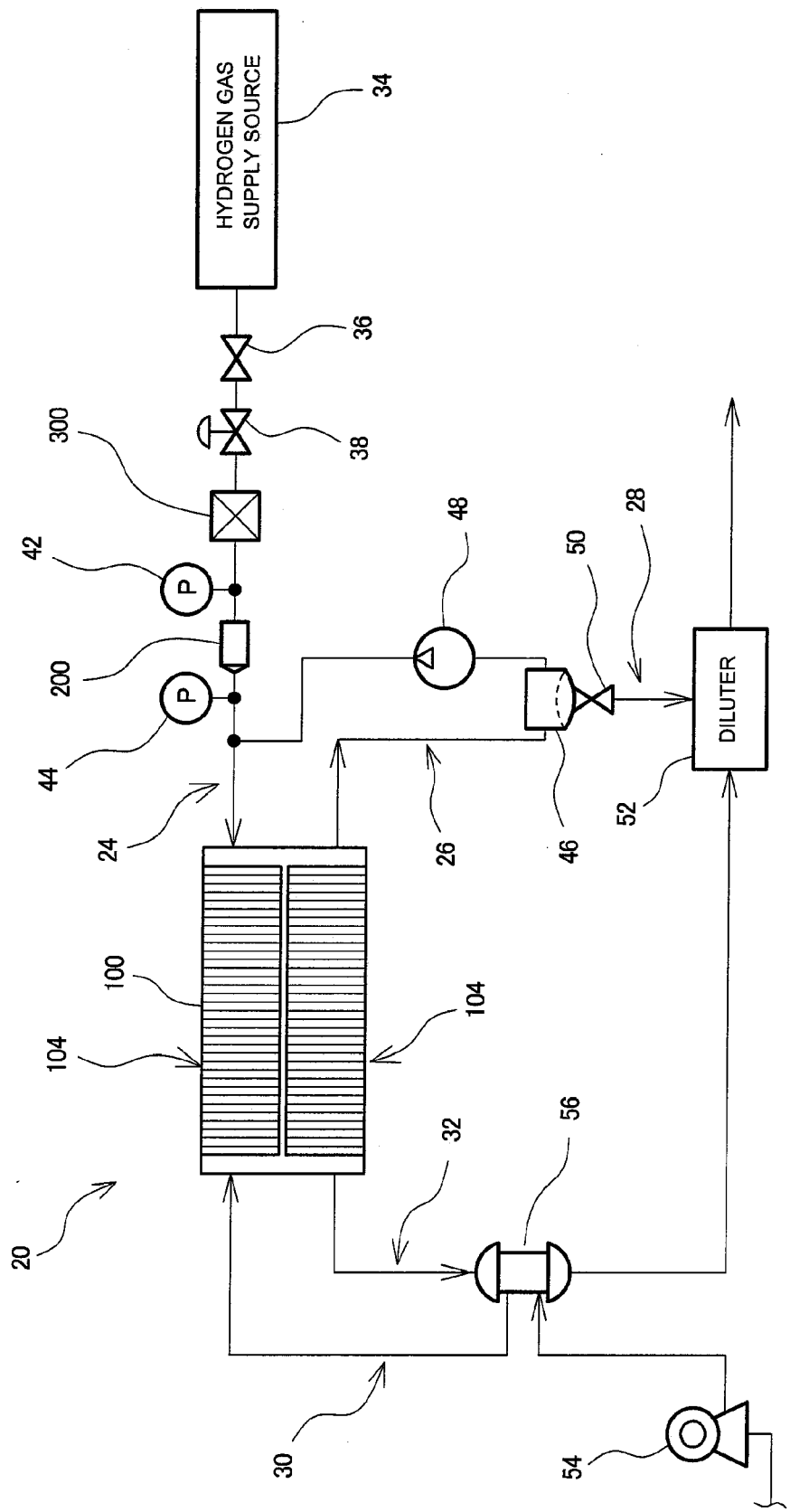
FIG. 1 is a diagram for explaining an example structure of a fuel cell system according to a preferred embodiment of the present invention.

FIG. 1 is a diagram for explaining a structure of a fuel cell system 20 which is an example of a fuel cell system of a preferred embodiment of the present invention. The fuel cell system 20 comprises a fuel cell 100 which generates power through an electrochemical reaction between fuel gas and oxidizing gas. Here, hydrogen gas is exemplified as the fuel gas and oxygen gas in the air is exemplified as the oxidizing gas, but the fuel gas and the oxidizing gas are not limited to these gases. The fuel gas and the oxidizing gas may sometimes be collectively referred to as reaction gas.

Figure 2:
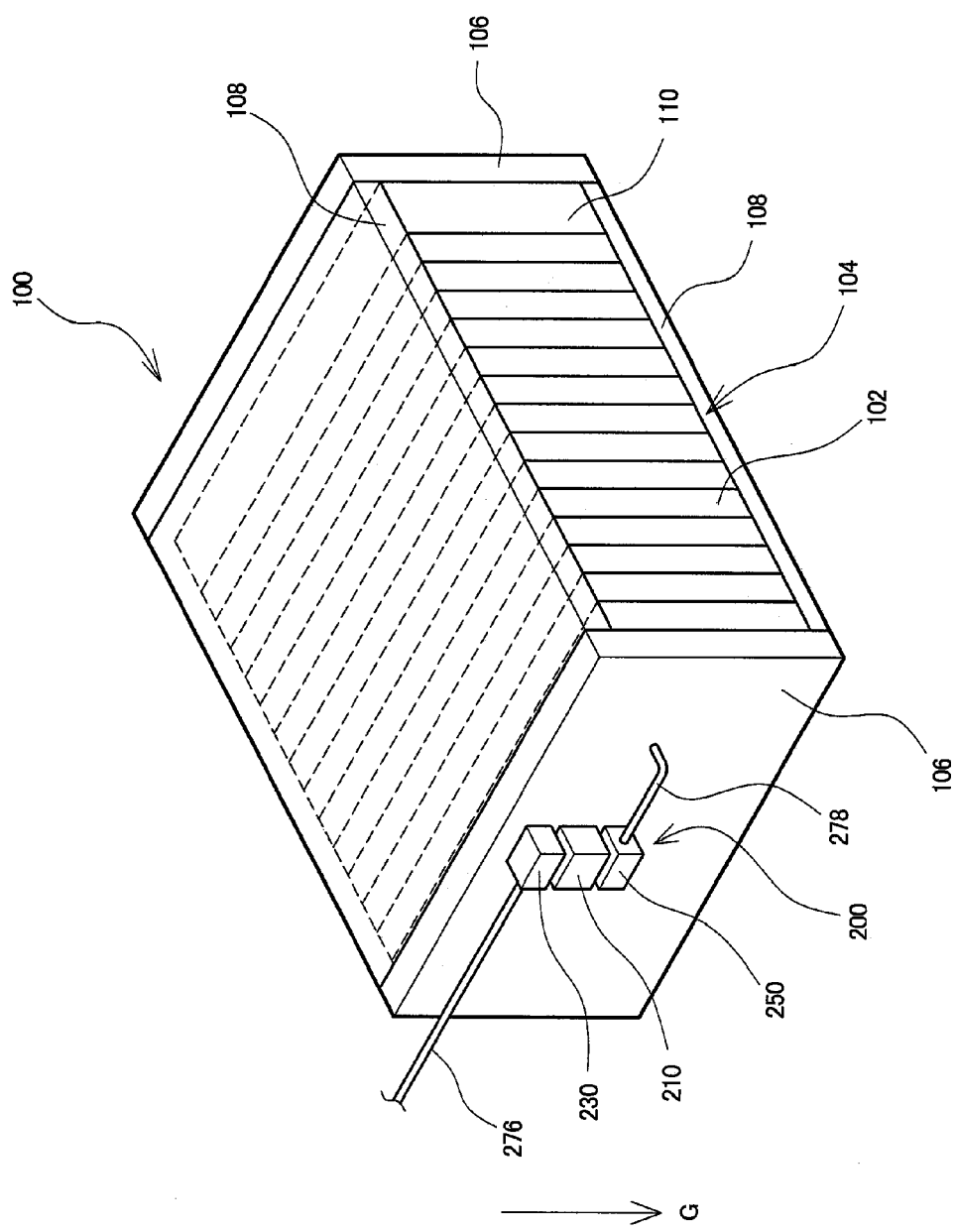
FIG. 2 is a perspective view for explaining a fuel cell in a preferred embodiment of the present invention.

FIG. 2 is a perspective view for explaining an example structure of the fuel cell 100. The fuel cell 100 is, for example, a polymer electrolyte fuel cell (PEFC). The fuel cell 100 comprises a cell stack 104 in which a plurality of battery cells 102 are stacked, the battery cell 102 including, for example, a membrane electrode assembly (MEA) and separators sandwiching the MEA. In the MEA, for example, a polymer electrolyte membrane is sandwiched by gas diffusion electrodes and integrally assembled. The number of stacks of the battery cells 102 is not limited to that shown in FIG. 2.

Endplates 106 are placed at respective ends in the cell stacking direction of the cell stack 104, and tension plates 108 are placed at respective ends in a direction perpendicular to the cell stacking direction. In other words, the cell stack 104 is placed between a pair of end plates 106 and between a pair of the tension plates 108. The respective end plates 106 and tension plates 108 are connected to each other by, for example, welding or with a bolt (not shown), and the pair of end plates 106 are connected to each other via the tension plates 108. The end plates 106 and the tension plates 108 can be formed, for example, from plate-shaped members made of stainless steel (SUS).

In this description, there is exemplified a structure in which the tension plates 108 are placed at upper and lower sections of the cell stack 104, but, alternatively, it is also possible to place the tension plates 108 on respective sides of the cell stack 104. In addition, the shapes or the like of the end plate 106 and the tension plate 108 are not limited to those shown in FIG. 2. Alternatively, the pair of end plates 106 may be connected to each other by a connecting member other than the tension plates 108, which are plate-shaped members. For example, the pair of end plates 106 may be connected to each other by welding or tightening a bolt for a rod-shaped member or by a bolt and a nut, the bolt having a length extending between the pair of end plates 106.

A spring module 110 is placed between one end plate 106 and the cell stack 104. The spring module 110 is formed, for example, to include a plurality of springs, and a load toward the other end plate 106 is applied on the cell stack 104 by a biasing force of the springs.

In FIG. 2, one cell stack 104 is shown. Alternatively, for example, a plurality of cell stacks 104 may be placed in parallel between the pair of end plates 106 (refer to FIG. 1).

Turning again to FIG. 1, the fuel cell system 20 comprises a hydrogen gas supply flow path 24, a hydrogen gas circulation flow path 26, a hydrogen gas exhaust flow path 28, an oxygen gas supply flow path 30, and an oxygen gas exhaust flow path 32. The fluid flow paths 24, 26, 28, 30, and 32 are connected to the cell stack 104, as will be clearly understood based on the following description.

In addition, the fuel cell system 20 comprises a hydrogen gas supply source 34 and a compressor 54. The hydrogen gas supply source 34 may be formed from, for example, one or more of a hydrogen tank, a hydrogen occlusion alloy, a fuel reformer, etc. The compressor 54 captures air including oxygen and pressurizes and sends the air, and may also be called an oxygen gas supply source. Alternatively, in place of the compressor 54, for example, an oxygen tank or the like, which is an example of an oxygen gas supply source, may be used.

The hydrogen gas supply flow path 24 connects between the hydrogen gas supply source 34 and the cell stack 104, and is a flow path for supplying hydrogen gas from the hydrogen gas supply source 34 to the cell stack 104. The hydrogen gas supply flow path 24 comprises, for example, a fluid pipe (hereinafter simply referred to as a "pipe"), a blocking valve 36 provided on the pipe, a regulator 38, a surge tank 300, a pressure meter 42, a fluid regulation device 200, and a pressure meter 44. The elements 36, 38, 300, 42, 200, and 44 are provided in the exemplified configuration in this order from the side of the hydrogen gas supply source 34; that is, from the upstream side of the flow of the gas. The fluid regulation device 200 will be described in more detail later.

The hydrogen gas circulation flow path 26 connects between the cell stack 104 and the hydrogen gas supply flow path 24, and is a flow path for supplying and circulating back to the cell stack 104 hydrogen-off gas flowing out through the cell stack 104. In this configuration, the hydrogen gas circulation flow path 26 is connected to the hydrogen gas supply flow path 24 at a downstream side of the pressure meter 44. The hydrogen gas circulation flow path 26 comprises, for example, a pipe, a gas/liquid separator 46 provided on the pipe, and a pump 48. The gas/liquid separator 46 is for recovering moisture or the like from the hydrogen-off gas. The pump 48 pressurizes the hydrogen-off gas which has passed through the gas/liquid separator 46 and sends the gas to the hydrogen gas supply flow path 24. The elements 46 and 48 are provided in the exemplified configuration in this order from the side of the cell stack 104; that is, from the upstream side of the flow of the gas.

The hydrogen gas exhaust flow path 28 is connected to an exhaust exit of the gas/liquid separator 46, and is a flow path for exhausting the hydrogen-off gas including impurity separated in the gas/liquid separator 46 to the outside of the fuel cell system 20. The moisture or the like separated by the gas/liquid separator 46 can also be exhausted through the hydrogen gas exhaust flow path 28. The hydrogen gas exhaust flow path 28 comprises, for example, a pipe, an exhaust valve (purge valve) 50 provided on the pipe, and a diluter 52. The elements 50 and 52 are provided in the exemplified configuration in this order from the side of the gas/liquid separator 46; that is, from the upstream side of the flow of the gas.

The oxygen gas supply flow path 30 connects between an exit of the compressor 54 and the cell stack 104, and is a flow path for supplying air including oxygen gas from the compressor 54 to the cell stack 104. The oxygen gas supply flow path 30 comprises, for example, a pipe, and a humidifier 56 provided on the pipe.

The oxygen gas exhaust flow path 32 is connected to the cell stack 104, and is a flow path for exhausting oxygen-off gas flowing out through the cell stack 104, to the outside of the fuel cell system 20. The oxygen gas exhaust flow path 32 comprises, for example, a pipe, and the humidifier 56 and the diluter 52 which are provided on the pipe. In this description, there is exemplified a configuration in which the humidifier 56 is shared between the oxygen gas supply flow path 30 and the oxygen gas exhaust flow path 32, but alternatively, separate humidifiers may be provided on the flow paths 30 and 32. The elements 56 and 52 are provided in the exemplified configuration in this order from the side of the cell stack 104; that is, from the upstream side of the flow of the gas. The oxygen-off gas passing through the humidifier 56 is mixed with the hydrogen-off gas by the diluter 52, and is exhausted to the outside of the fuel cell system 20 along with the hydrogen-off gas. In the exemplified configuration, the diluter 52 is shared between the oxygen gas exhaust flow path 32 and the hydrogen gas exhaust flow path 28.

The fluid regulation device 200 will now be described. The fluid regulation device 200 is a device which regulates a status of fluid (here, hydrogen gas) flowing in the flow path 24 on which the device 200 is provided. The status of the hydrogen gas regulated by the fluid regulation device 200 is, for example, flow rate, pressure, or the like of the hydrogen gas to be supplied to the downstream side of the flow path, and the flow rate, pressure, or the like of the hydrogen gas to be supplied to the cell stack 104 are regulated by the regulation of the gas status. Because the fluid regulation device 200 is used for supply of hydrogen gas to the cell stack 104, the device 200 is also called an injector 200. The fluid regulation device 200 may be formed, for example, from an electromagnetic valve device, and, in this description, an electromagnetic valve device is exemplified as the device 200.

As shown in FIG. 2, the electromagnetic valve device 200 is placed on the end plate 106; more specifically, on a surface of the end plate 106 opposite the surface facing the cell stack 104.

Figure 3:
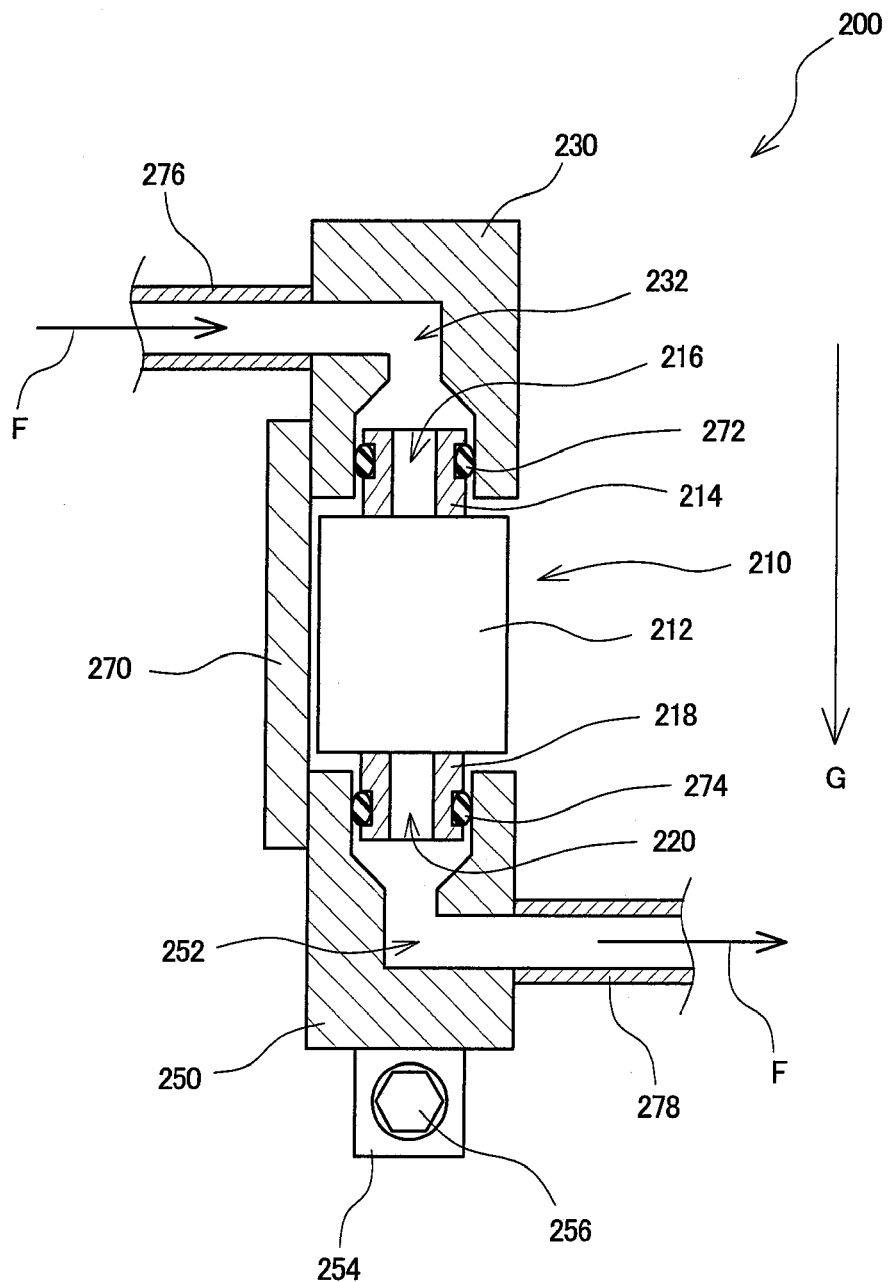
FIG. 3 is a schematic view for explaining a fluid regulation device in a preferred embodiment of the present invention.

FIG. 3 is a schematic diagram for explaining the electromagnetic valve device 200. FIG. 3 is a diagram showing the end plate 106 as viewed from a side of the placement surface of the electromagnetic valve device 200, and a part of the structure is shown in cross section for the purpose of explanation. In FIG. 3, an arrow F represents a direction of flow of the hydrogen gas and an arrow G represents a direction of gravity.

The electromagnetic valve device 200 shown in FIG. 3 comprises a body portion 210, an entrance-side support member 230, an exit-side support member 250, and a connecting member 270. The members 230, 250, and 270 may be formed, for example, from a metal such as stainless steel (SUS) or aluminum, a resin, or the like.

The body portion 210 is a portion which regulates the status of the hydrogen gas. The body portion 210 comprises a cylinder portion 212, a cylinder entrance portion 214, and a cylinder exit portion 218. Although not shown in detail in the drawings, in the cylinder portion 212, a fluid flow path, a valve element provided partway in the flow path, a solenoid which controls the valve element, etc. are built in. Various structures may be employed as the internal structure of the cylinder portion 212. The solenoid is driven by a driving unit (not shown). The cylinder entrance portion 214 and the cylinder exit portion 218 have, for example, a cylindrical shape, with the flow path 216 of the entrance portion 214 being in communication with the entrance of the flow path of the cylinder portion 212 and the flow path 220 of the exit portion 218 being in communication with the exit of the flow path of the cylinder portion 212.

The entrance-side support member 230 and the exit-side support member 250 are members which support the body portion 210. The two support members 230 and 250 are connected by the connecting member 270. The shape, size, placement relationship, etc. of the connecting member 270 are not limited to those shown in the exemplified configuration.

The support members 230 and 250 have flow paths 232 and 252, respectively. The cylinder entrance portion 214 is inserted into one of the ends of the flow path 232, and the cylinder exit portion 218 is inserted to one of the ends of the flow path 252. The electromagnetic valve device 200 comprises O-rings 272 and 274 made of, for example, rubber. The O-ring 272 is fitted to the cylinder entrance portion 214 and seals between the entrance-side support member 230 and the body portion 210. The O-ring 274 is fitted to the cylinder exit portion 218 and seals between the exit-side support member 250 and the body portion 210. With this structure, the support members 230 and 250 support the body portion 210 via the O-rings 272 and 274. Although rubber O-rings 272 and 274 are exemplified, it is also possible to use sealing members of other materials or shapes.

Here, because of the interposition of the O-rings 272 and 274, the support members 230 and 250 can support the body portion 210 in a state where the support members 230 and 250 are not in contact with the body portion 210. In this case, the vibration due to movement of the valve element in the body portion 210 is attenuated by the elasticity (or cushioning) of the O-rings 272 and 274, and transfer of the vibration to the support members 230 and 250 is inhibited.

On the other end of the flow path 232 of the entrance-side support member 230, a pipe 276 is connected through, for example, welding. The pipe 276 forms a flow path, of the hydrogen gas supply flow path 24, to the hydrogen gas supply source 34. In this structure, the entrance-side support member 230 corresponds to the fluid entrance-side portion in the electromagnetic valve device 200. On the other end of the flow path 252 of the exit-side support member 250, a pipe 278 is connected through, for example, welding. The pipe 278 forms a flow path, of the hydrogen gas supply flow path 24, to the cell stack 104, and is connected to the cell stack 104 through a through hole (not shown) in the end plate 106. In this structure, the exit-side support member 250 corresponds to the fluid exit-side portion in the electromagnetic valve device 200. The connecting positions of the pipes 276 and 278 and the directions of extension of the pipes 276 and 278, etc. in the support members 230 and 250 are not limited to those shown in the drawings.

The exit-side support member 250 comprises a segment portion 254 which is fixed on the end plate 106 by a bolt 256. Specifically, in the structure exemplified in FIG. 3, the electromagnetic valve device 200 is fixed on the end plate 106 at the exit-side support member 250. Here, the expression "fix" refers to a placement and placement state with a fixing point which is a location that does not move. In the example configuration described above, the fastening portion by the bolt 256; that is, the segment portion 254, forms the fixing point which does not move with respect to the end plate 106. Although fixation by screwing with the bolt 256 is exemplified, it is also possible to fix with other means such as, for example, welding. Alternatively, it is also possible to achieve the fixation on the end plate 106 without the use of the segment portion 254.

On the other hand, in the exemplified configuration of FIG. 3, the entrance-side support member 230 is not fixed on the end plate 106, and the electromagnetic valve device 200 is fixed to the end plate 106 only with the exit-side support member 250.

Figure 4:
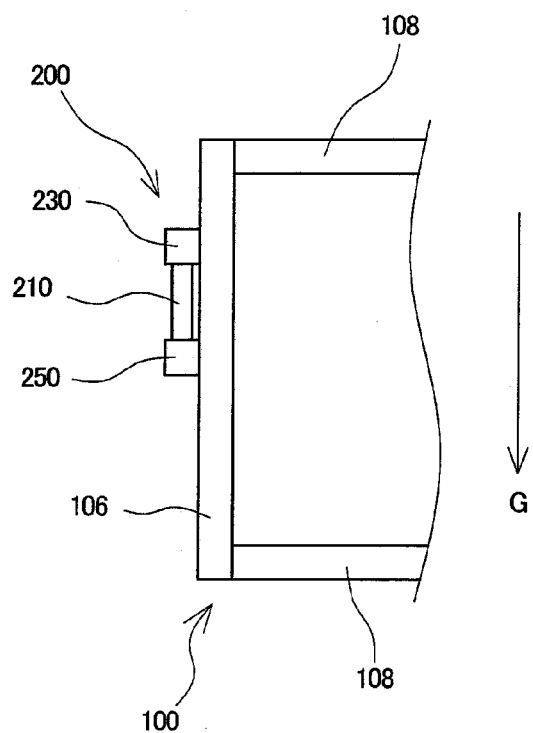
FIG. 4 is a schematic view for explaining a fuel cell system according to a preferred embodiment of the present invention.
Figure 5:
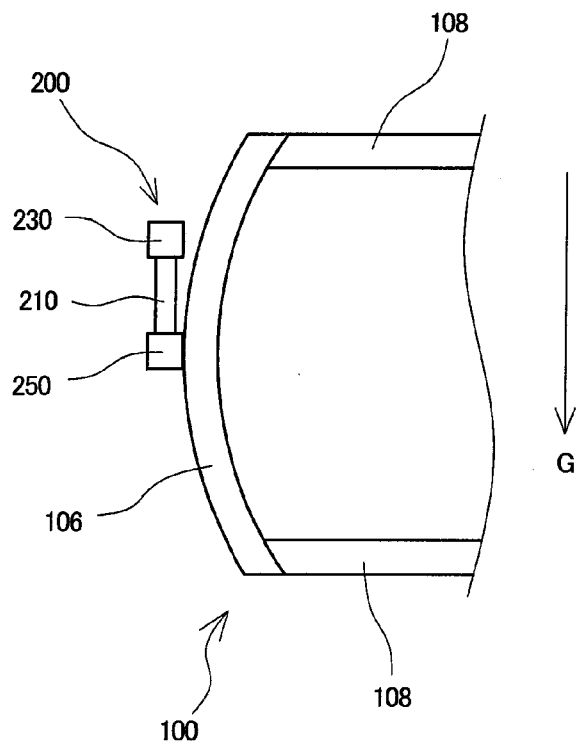
FIG. 5 is a schematic view for explaining a fuel cell system according to a preferred embodiment of the present invention.

FIGS. 4 and 5 are schematic diagrams showing the fuel cell 100 from the sides. FIG. 4 shows a state where there is no deflection in the end plate 106 and FIG. 5 shows a state where a deflection is caused. In FIGS. 4 and 5, the cell stack 104 (refer to FIG. 2) or the like are not shown, in order to avoid complexity in the drawings.

When only the exit-side support member 250 is fixed to the end plate 106 as described above, as is clear from comparison of FIGS. 4 and 5, even when the end plate 106 is deflected, the entrance-side support member 230 can be moved (displaced) with respect to the end plate 106. Therefore, compared to the case where both the support members 230 and 250 are fixed to the end plate 106, the influence of the deflection on the electromagnetic valve device 200 is reduced, and the disadvantages due to the deflection of the end plate 106 can be inhibited.

For example, even when the end plate 106 is deflected, the support by the O-rings 272 and 274 is maintained for the body portion 210 and the support members 230 and 250, and the contact between the body portion 210 and the support members 230 and 250 is prevented. Thus, transfer of the vibration of the valve element in the body portion 210 to the end plate 106 or the like via the support members 230 and 250 can be inhibited. Therefore, disadvantages caused by the transferred vibration; for example, creation of strong vibration and loud noise and damage to the soldering portions of the circuit board, can be inhibited. In addition, for example, the contact of the deflected end plate 106 on the body portion 210 of the electromagnetic valve device 200 can be prevented, and disadvantages caused by vibration transferred to the end plate 106 or the like can be inhibited, similar to the above.

In order to prevent transfer of the vibration even when there is no deflection in the end plate 106, the body portion 210 of the electromagnetic valve device 200 is provided to not contact the end plate 106 and the connecting member 270 (refer to FIGS. 4 and 3). The placement form may be achieved, for example, by suitably setting the shapes, sizes, etc. of the support members 230 and 250.

Figure 6:
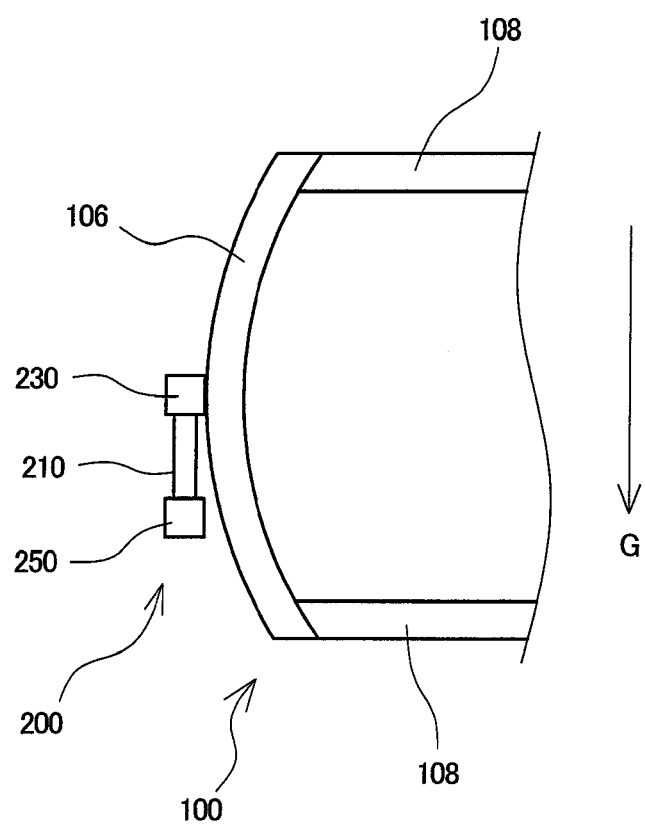
FIG. 6 is a schematic view for explaining a fuel cell system according to a preferred embodiment of the present invention.

As shown in a schematic diagram of FIG. 6, the electromagnetic valve device 200 may be fixed on the endplate 106 at the entrance-side support member 230. If a case where the electromagnetic valve device 200 is fixed at the entrance-side support member 230 and a case where the electromagnetic valve device 200 is fixed at the exit-side support member 250 are compared, it can be seen that the latter case has the following advantages.

Specifically, as described above, the entrance-side support member 230 is connected to the flow path to the hydrogen gas supply source 34, and the exit-side support member 250 is connected to the flow path to the cell stack 104 (refer to pipes 276 and 278 in FIG. 2). In this case, in the point of view from the electromagnetic valve device 200 placed on the end plate 106, the flow path to the hydrogen gas supply source 34 is longer than the flow path to the cell stack 104. In consideration of this, it is easier to absorb the mechanical stress applied by the deflection of the end plate 106 on the flow path by connecting the longer flow path and the support member 230 which is not fixed to the end plate 106. With this structure, for example, damage to the pipe connection section or the like can be inhibited. In addition, it is possible to absorb, with the longer flow path, any placement error of the electromagnetic valve device 200 with respect to the end plate 106. On the other hand, when the shorter flow path and the support member 250 fixed on the end plate 106 are connected, even when the end plate 106 is deflected, the relative position between the end plate 106 and the shorter flow path can be maintained. Because of this, the mechanical stress due to the deflection does not tend to affect the shorter flow path, and, for example, damage to the pipe connection section or the like can be inhibited.

The electromagnetic valve device 200 may be provided in various orientations. However, by providing the electromagnetic valve device 200 so that the entrance-side support member 230 is at an upper side in the direction of gravity in relation to the exit-side support member 250, it is possible to prevent intrusion into the electromagnetic valve device 200 of water produced in the cell stack 104.

Figure 7:
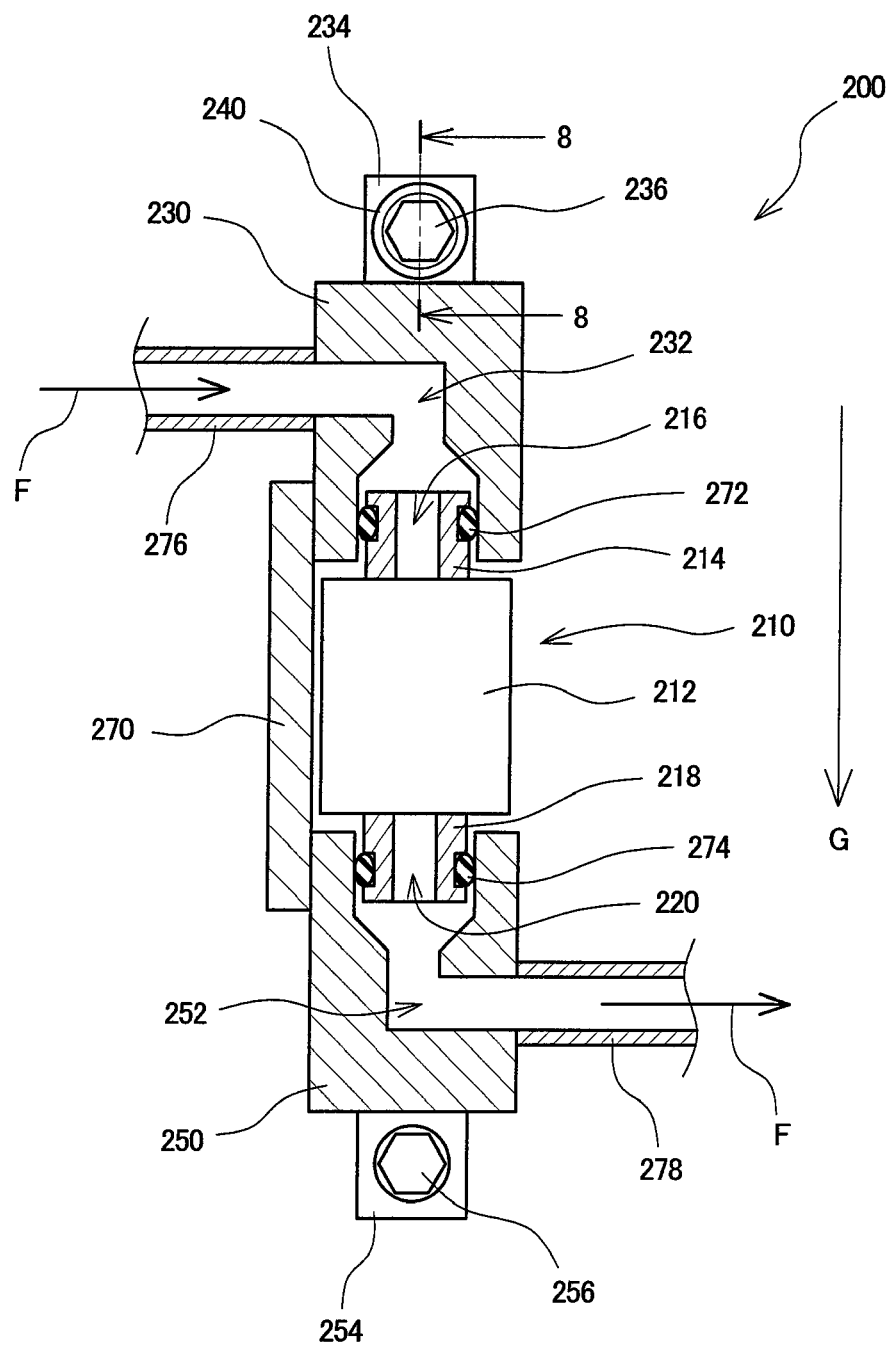
FIG. 7 is a schematic view for explaining a fluid regulation device in a preferred embodiment of the present invention.
Figure 8:
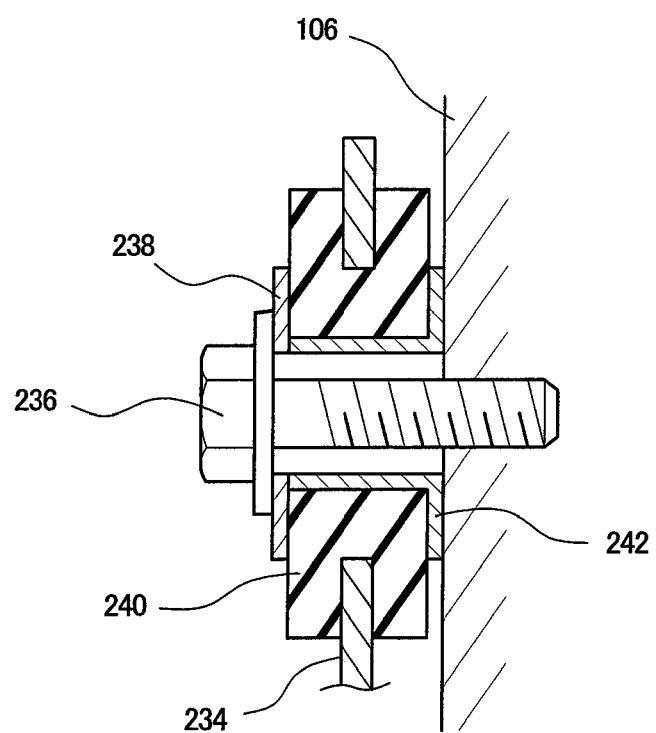
FIG. 8 is a cross sectional view along a line 8-8 in FIG. 7.

As exemplified in FIGS. 7 and 8, the entrance-side support member 230 may be attached to the end plate 106 via an elastic body 240. FIG. 7 is a schematic diagram similar to FIG. 3, and FIG. 8 is a cross sectional diagram along a line 8-8 in FIG. 7.

FIGS. 7 and 8 show a configuration where the elastic body 240 is formed from a rubber bush. The bush 240 shown in the drawings is a tubular member having a hole corresponding to a bolt insertion hole of a segment portion 234 provided on the entrance-side support member 230, and has, on its outer peripheral surface, a groove to which an edge of the bolt insertion hole of the segment portion 234 is inserted. With the bush 240 fitted into the bolt insertion hole of the segment portion 234, the bush 240 interposes between the segment portion 234 and the end plate 106. A bolt 236 is inserted into the hole of the bush 240, and is fastened to the end plate 106. A collar 242 made of, for example, a metal is inserted to the bolt insertion hole of the bush 240. With the collar 242 interposed between the end plate 106 and a washer 238 inserted to a head side of the bolt 236, the axial force of the bolt 236 is secured. The other elements in the exemplified configuration of FIGS. 7 and 8 may be configured similarly to those of FIG. 3.

When the entrance-side support member 230 is fixed to the end plate 106 (refer to FIG. 6), the exit-side support member 250 is attached to the end plate 106 via the bush 240.

The attachment location to the end plate 106 by the bolt 236 and the fixing location to the end plate 106 by the bolt 256 preferably fall on an axis of the body portion 210; that is, on a line connecting the flow path 216 of the cylinder entrance portion 214 and the flow path 220 of the cylinder exit portion 218. With such a configuration, the body portion 210 can be placed with superior balance, and, as a result, the number of bushes 240 can be minimized and increase in cost can be inhibited.

The bush 240 can be deformed by virtue of its elasticity (cushioning capability). Because of this, as compared with the exit-side support member 250 fixed to the end plate 106, the entrance-side support member 230 can be moved (displaced) with respect to the end plate 106. Therefore, with the elasticity of the bush 240, it is possible to absorb the load applied by the deflection of the endplate 106 to the electromagnetic valve device 200. With this structure, even when the end plate 106 is deflected, support by the O-rings 272 and 274 for the body portion 210 and the support members 230 and 250 is maintained, and, thus, transfer of vibration due to contact between the body portion 210 and the support members 230 and 250 can be inhibited.

In addition, when the fuel cell system 20 is equipped in an automobile or the like, vibration due to running of the vehicle may be applied on the fuel cell system 20. However, with the bush 240, disadvantages due to vibration from the outside can be prevented. For example, collision between the entrance-side support member 230 and the endplate 106 can be prevented. Moreover, for example, loosening of the bolts 236 and 256 can be prevented. With the loosening prevention effect of the bolts 236 and 256, torque management of the bolts 236 and 256 can be relaxed.

Figure 9:
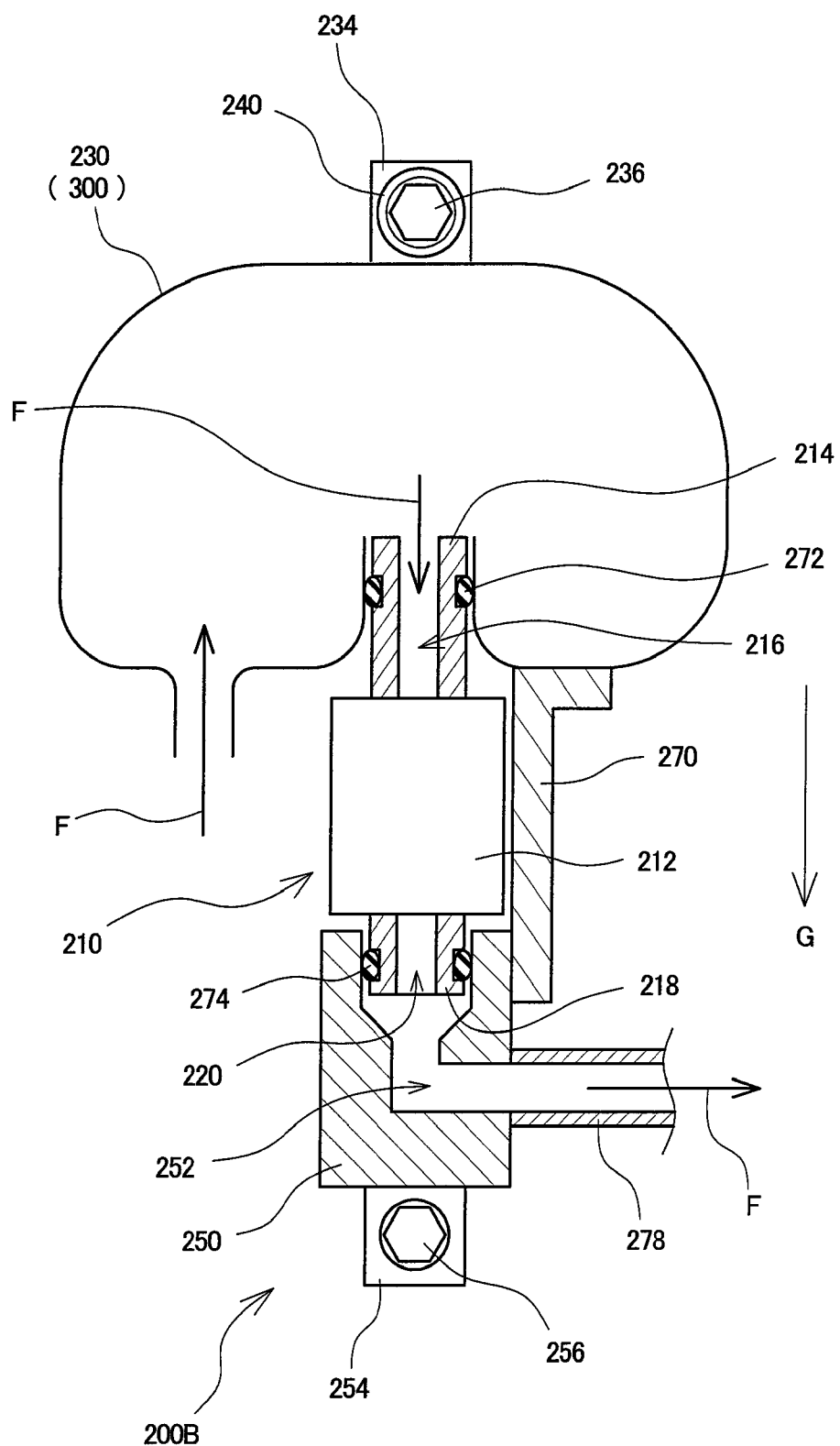
FIG. 9 is a schematic view for explaining a fluid regulation device in a preferred embodiment of the present invention.

When, for example, the entrance-side support member 230 is formed with a surge tank 300 as in an electromagnetic valve device 200B shown in a schematic diagram of FIG. 9, the portion at an upper section in the direction of gravity is enlarged and the weight is increased. In such a case also, by attaching the entrance-side support member 230 to the end plate 106 via the elastic body 240, it is possible to stabilize the placement of the electromagnetic valve device 200B. The other elements in the exemplified configuration of FIG. 9 may be configured similarly to those in FIG. 3.

As described, with the bush 240, the load imposed by the deflection of the endplate 106 can be absorbed. Although the load is also applied to the O-rings 272 and 274, the load can be distributed among the bush 240 and the O-rings 272 and 274. Because of this, the load applied on the O-rings 272 and 274 is smaller as compared to the case where there is no bush 240. Therefore, even when the load due to the deflection of the end plate 106 is applied to the O-rings 272 and 274, contact between the cylinder entrance portion 214 and the entrance-side support member 230 and contact between the cylinder exit portion 218 and the exit-side support member 250 can be avoided. This advantage is obtained because elastic bodies are present both between the cylinder entrance portion 214 and the end plate 106 and between the cylinder exit portion 218 and the end plate 106. In consideration of this, for example, even for a structure where the cylinder entrance portion 214 and the entrance-side support member 230 are connected by welding or the like and not using the O-ring 272, the contact between the cylinder exit portion 218 and the exit-side support member 250 can be avoided with the O-ring 274 and the bush 240.

In addition, because the bush 240 and the O-rings 272 and 274 are formed from rubber or the like, which is an insulating structure, by forming the connecting member 270 from an insulating structure such as a resin, it is possible to electrically insulate the entrance-side support member 230 and the pipe 276 connected to the entrance-side support member 230, the hydrogen gas supply source 34 (refer to FIG. 1), or the like, from the endplate 106. For example, when the hydrogen gas supply source 34 is electrically connected to the vehicle body, insulation of the endplate 106 from the potential of the vehicle body can be secured. This advantage can be obtained also when the bush 240, the O-rings 272 and 274, and the connecting member 270 are formed from other insulating materials.

In the structure where the entrance-side support member 230 is not attached via the rubber bush 240 (refer to FIG. 3 or the like), when the end plate 106 is deflected, the end plate 106 and the entrance-side support member 230 would be in a non-contact state. In such a non-contact state also, by forming the O-rings 272 and 274 and the connecting member 270 from an insulating material, it is possible to electrically insulate the entrance-side support member 230 or the like and the end plate 106. In this case, by forming the O-rings 272 and 274 and the connecting member 270 from an insulating material and, for example, employing a shape of the entrance-side support member 230 which does not contact the end plate 106, it is possible to electrically insulate the entrance-side support member 230 or the like and the end plate 106, regardless of the presence/absence of the deflection of the end plate 106.

In the above description, electromagnetic valve devices 200 and 200B have been exemplified as the fluid regulation device, but other open/close valve devices employing other methods; for example, a regulator 38 or the like, may alternatively be employed. In addition, in the above description, a case is exemplified in which the fluid regulation device is provided on the hydrogen gas supply flow path 24, but alternatively, the above-described structures may be applied to the fluid regulation devices provided on other fluid paths 26, 28, 30, and 32 (refer to FIG. 1). For example, when an oxygen tank is used in place of the compressor 54, the electromagnetic valve devices 200 and 200B may be provided on the oxygen gas supply flow path 30. In addition, the status of the fluid regulated by the fluid regulation device is not limited to flow rate and pressure. For example, because the humidifier 56 regulates humidity, which is one of statuses of the gas for the oxygen gas flowing in the flow paths 30 and 32 and because, for example, the gas/liquid separator 46 regulates purity, which is one of statuses of the gas for the hydrogen gas flowing the flow path 26, the humidifier 56 and the gas/liquid separator 46 may be considered fluid regulation devices.

In the above-description, gas flow paths 24, 26, 28, 30, and 32 are exemplified as the flow paths, but alternatively, the above-described structures may be applied to, for example, a flow path of a coolant for cooling the fuel cell 100, which is connected to the fuel cell 100.

The invention claimed is:

1. A fuel cell system comprising:
    a cell stack in which a plurality of battery cells are stacked;
    an end plate placed on an end with respect to a cell stacking direction of the cell stack;
    a fluid regulation device which regulates a flow rate of a fluid flowing into the cell stack;
    an entrance pipe which connects a fluid supply source and the fluid regulation device; and
    an exit pipe which communicates with the cell stack from the fluid regulation device and which allows the fluid to flow into the cell stack from the fluid regulation device,
    wherein the fluid regulation device comprises:
    a body portion;
    an entrance portion projecting from a fluid entrance-side edge of the body portion;
    an exit portion projecting from a fluid exit-side edge of the body portion;
    a fluid entrance-side portion within which a first flow path for communicating the entrance pipe with the body portion is formed and which has a first end through which the entrance portion is inserted into one edge of the first flow path; and
    a fluid exit-side portion within which a second flow path for communicating the exit pipe with the body portion is formed and which has a second end through which the exit portion is inserted into one edge of the second flow path,
    wherein in the body portion, the entrance portion and the exit portion are respectively supported by the fluid entrance-side portion placed at an upper side and the fluid exit-side portion placed at a lower side,
    wherein the fluid exit-side portion of the fluid regulation device is directly fixed to the end plate, and the fluid entrance-side portion is attached to the end plate via an elastic body.

2. The fuel cell system according to claim 1,
    wherein elastic sealing members are placed at least one of between the first end of the fluid entrance-side portion and the entrance portion and between the second end of the fluid exit-side portion and the exit portion.

* * * * *